United States Patent
Takizawa et al.

(10) Patent No.: US 8,295,842 B2
(45) Date of Patent: Oct. 23, 2012

(54) BASE STATION CONTROLLER AND WIRELESS PACKET PROCESSING DEVICE

(75) Inventors: Eiichiro Takizawa, Yokohama (JP); Yi Lou, Yokohama (JP); Masao Hayama, Yokohama (JP); Michihiro Asanuma, Chigasaki (JP); Takaaki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 12/816,067

(22) Filed: Jun. 15, 2010

(65) Prior Publication Data

US 2010/0322192 A1 Dec. 23, 2010

(30) Foreign Application Priority Data

Jun. 18, 2009 (JP) .................. 2009-145288

(51) Int. Cl.
*H04W 36/00* (2009.01)
(52) U.S. Cl. ...................................... 455/436
(58) Field of Classification Search .......... 455/403, 455/422.1, 436, 442; 370/310, 328, 329, 370/331
See application file for complete search history.

(56) References Cited

U.S. PATENT DOCUMENTS

| | | | |
|---|---|---|---|
| 6,766,168 B1* | 7/2004 | Lim | 455/435.1 |
| 6,950,415 B2* | 9/2005 | Chang et al. | 370/331 |
| 6,963,550 B2* | 11/2005 | Choi et al. | 370/331 |
| 7,110,377 B2* | 9/2006 | Hsu et al. | 370/331 |
| 7,130,614 B2* | 10/2006 | Sreemanthula et al. | 455/411 |
| 7,529,208 B2* | 5/2009 | Choi et al. | 370/331 |
| 7,702,364 B2* | 4/2010 | Ray et al. | 455/561 |
| 8,023,464 B2* | 9/2011 | Hsu et al. | 370/331 |
| 2002/0041576 A1* | 4/2002 | Chang et al. | 370/331 |
| 2002/0048266 A1* | 4/2002 | Choi et al. | 370/331 |
| 2002/0176382 A1* | 11/2002 | Madour et al. | 370/331 |
| 2004/0071112 A1* | 4/2004 | Hsu et al. | 370/331 |
| 2005/0094601 A1* | 5/2005 | Hsu et al. | 370/331 |
| 2005/0185623 A1* | 8/2005 | Ray et al. | 370/338 |
| 2006/0013165 A1* | 1/2006 | Choi et al. | 370/331 |
| 2010/0322192 A1* | 12/2010 | Takizawa et al. | 370/331 |

OTHER PUBLICATIONS

3GPP2, cdma2000 High Rate Packet Data Air Interface Specification, 3GPP2 C.S0024-A Version 3.0, Sep. 2006, pp. 4-33-4-36, 8-158-8-169.

* cited by examiner

*Primary Examiner* — Fan Ng
(74) *Attorney, Agent, or Firm* — Foley & Lardner LLP

(57) ABSTRACT

Call connection processing is performed and a message is processed in a different subnet without UATI reassignment and takeover of a wireless session. RANs that belong to different subnets and are adjacent to each other use messages to exchange ColorCode, IP addresses of base station controllers, wireless resource information of base station transceiver subsystems and the like. When the RAN receives, from an AT, a message having ColorCode that is different from Color-Code of the RAN, the RAN transfers the message to a base station controller included in the RAN having ColorCode that matches the ColorCode included in the message.

13 Claims, 7 Drawing Sheets

FIG. 5
410

| PARAMETER NAME |
| --- |
| ColorCode [1] — 411 |
| Subnet [1] — 412 |
| BTSIPAddress [FOR NUMBER OF BTSs] — 413 |
| PilotPN [FOR NUMBER OF BTSs] — 414 |
| NeighborBSCAddress [FOR NUMBER OF ADJACENT BSCs] — 415 |

FIG. 6
420

| PARAMETER NAME |
| --- |
| BSCIPAddress [1] — 421 |

FIG. 7
430

| PARAMETER NAME |
| --- |
| NeighborBSCAddress — 431 |
| ColorCode — 432 |
| BTSIPAddress [FOR NUMBER OF BTSs] — 433 |
| PilotPN [FOR NUMBER OF BTSs] — 434 |

FIG. 8
460

| Field | Length (bit) |
|---|---|
| MessageID | 8 |
| MessageSequence | 8 |
| ReferencePilotPN | 9 |
| ReferencePilotStrength | 6 |
| ReferenceKeep | 1 |
| NumPilots | 4 |
| NumPilots occurrences of the following fields: | |
| PilotsPNPhase | 15 |
| ChannelIncluded | 1 |
| Channel | 0 or 24 |
| PilotStrength | 6 |
| Keep | 1 |
| Reserved | Variable |

FIG. 9
450

| PARAMETER NAME | |
|---|---|
| TRAFFIC CHANNEL IDENTIFIERS [FOR NUMBER OF TRAFFIC CHANNELS] | ~451 |
| UATI32 [FOR NUMBER OF TRAFFIC CHANNELS] | ~452 |

FIG. 10
440

| PARAMETER NAME | |
|---|---|
| UATI32 [FOR NUMBER OF ATs] | ~441 |
| BSCIPAddress [FOR NUMBER OF ATs MULTIPLIED BY NUMBER OF BTSs] | ~442 |
| BTSIPAddress [FOR NUMBER OF ATs MULTIPLIED BY NUMBER Of BTSs] | ~443 |

US 8,295,842 B2

BASE STATION CONTROLLER AND WIRELESS PACKET PROCESSING DEVICE

CLAIM OF PRIORITY

The present application claims priority from Japanese patent application serial no. 2009-145288, filed on Jun. 18, 2009, the content of which is hereby incorporated by reference into this application.

BACKGROUND OF THE INVENTION

The present invention relates to a base station controller and a wireless packet processing device. The invention more particularly relates to a base station controller and a wireless packet processing device, which, when messages from a different subnet are received, perform relevant call connection processing and process such a message.

CDMA 2000 1xEvolution-Data Only (1xEV-DO) is a mobile wireless communication scheme specializing in data communications and is standardized in Non-Patent Document 1 ("cdma2000 High Rate Packet Data Air Interface Specification", 3GPP2 C.S0024-A Version 3.0 Sep. 2006) by 3rd Generation Partnership Project 2 (3GPP2) that is an international organization for standardization. CDMA 2000 1xEV-DO specializes in data communications to improve the frequency usage efficiency.

When an access terminal (AT) (that is a mobile terminal) performs communications with a radio access network (RAN), the RAN assigns unicast access terminal identifiers (UATI32 and UATI128) to the AT. The UATI32 and the UATI128 serve as identifiers that uniquely identify the AT. The following describes the configurations of the UATI32 and the UATI128 that are defined in Non-Patent Document 1 with reference to FIGS. 1 and 2.

As shown in FIG. 1, the UATI32 200 is constituted by 32 bits. Upper 8 bits of the UATI32 200 indicate ColorCode 201 that identifies the RAN. Lower 24 bits of the UATI32 200 can be freely assigned by the RAN as UATI24 202.

As shown in FIG. 2, the UATI128 210 is constituted by 128 bits. Upper 104 bits of the UATI128 210 indicate Subnet information 211 that identifies the RAN. Lower 24 bits of the UATI128 210 can be freely assigned by the RAN as UATI24 212. The UATI32 200 and the UATI128 210 are collectively called a UATI.

When the UATI is assigned to the AT, the AT and the RAN configure a wireless session therebetween. The wireless session indicates a group of a protocol and a parameter that are determined on the basis of functions that can be supported by the AT and the RAN and are confirmed by the AT and the RAN.

In order to perform data communications between the AT and the RAN, a wireless link is established between the AT and the RAN and a point-to-point protocol (PPP) is established between the AT and a packet data service node (PDSN). The state of the AT in this case is called an active state.

When a certain non-communication state occurs, the AT and the RAN release the wireless link. In this case, the wireless session is maintained in the RAN and the PPP is maintained between the AT and the PDSN. The state of the AT in this case is called a dormant state.

The AT regularly receives broadcast information such as a SectorParameters message (shown in FIG. 3A) from a base station transceiver subsystem that is included in the RAN. As shown in FIG. 3A, the SectorParameters message 400 is constituted by fields (such as MessageID, CountryCode, SectorID 401, SubnetMask, SectorSignature, SecondaryColorCodeIncluded, SecondaryColorCodeCount, SecondaryColorCode 402, and Reserved) and lengths (bits) of the fields. As shown in FIG. 3B, SectorID 401 of 128 bits is constituted by Subnet information 4011 of 104 bits and a sector identifier 4012 of 24 bits.

When the AT moves and passes through a boundary between RANs, the AT detects that the Subnet information 4011 of the SectorID 401 included in the SectorParameters message 400 transmitted from the destination RAN (to which the AT moves) is different from the Subnet information 211 included in the UATI128 210 of the AT. The AT that detects the movement transmits a UATIRequest message to the destination RAN in order to request assignment of a new UATI. The RAN receives the UATIRequest message and then acquires a wireless session of the AT from the RAN from which the AT moves. The RAN then assigns the new UATI to the AT. This handoff is called inter-RAN dormant handoff.

On the other hand, handoff that is performed when the AT that is in the active state moves and passes through a boundary between RANs is called inter-RAN active handoff. In the inter-RAN active handoff, a wireless session is taken over by the RAN from the other RAN and a UATI is reassigned to the AT under the condition that a wireless link is established.

When the AT is located at the boundary between the RANs, the AT alternately receives SectorParameters messages 400 that include the Subnet information 4011 of the RANs. Assignment of an UATI to the AT and transfer (takeover) of the wireless session are frequently performed between the RANs by using the messages as triggers when the AT is located at the boundary between the RANs. This results in waste of CPU utilization of network devices included in the RANs and waste of network resources and wireless resources. This effect is generally called a ping-pong effect.

To avoid this problem, Non-Patent Document 1 proposes use of SecondaryColorCode. ColorCode of a first RAN is registered, as SecondaryColorCode 402, into the SectorParameters message 400 that is transmitted by a base station transceiver subsystem that is included in a second RAN (that is adjacent to the first RAN) and located at the boundary between the first and second RANs, while ColorCode of the second RAN is registered, as SecondaryColorCode 402, into the SectorParameters message 400 that is transmitted by a base station transceiver subsystem that is included in the first RAN and located at the boundary between the first and second RANs. The AT does not transmit the UATIRequest message as long as the ColorCode 201 included in the UATI32 200 of the AT matches the SecondaryColorCode 402 included in the SectorParameters message 400. Thus, CDMA 1xEV-DO suppresses occurrence of the ping-pong effect between the RANs.

SUMMARY OF THE INVENTION

When the SecondaryColorCode is not used, the AT performs the inter-RAN dormant handoff every time the AT passes through the boundary between the RANs. In this case, the RAN reassigns a UATI to the AT and takes over the wireless session from the other RAN. Thus, the AT moves from a RAN to another RAN to perform call connection processing without reassignment of the UATI and acquisition of the wireless session.

The SecondaryColorCode has a function for suppressing occurrence of the inter-RAN dormant handoff when the AT passes through the boundary between the RANs. Thus, before the AT moves to the other RAN to perform the call connection processing, the reassignment of the UATI and the takeover of the wireless session are not performed. Thus, when the SecondaryColorCode is used, it is necessary to perform the call connection processing on a RAN on which a wireless session is not present. However, this method is not defined in Non-Patent Document 1.

According to study conducted by the present inventors, a method can be considered in which when the AT requests a call connection, the inter-RAN dormant handoff is performed and the call connection processing is then performed. This method is very similar to a conventional sequence. However, the inter-RAN dormant handoff has the following problems: reassignment of a UATI may fail due to a loss of a message in a wireless environment and takeover of a wireless session may take a long time. Especially, the UATI is reassigned under the condition that a wireless link is not established. Thus, there is a high possibility that the message is lost in the wireless environment.

When the reassignment of the UATI fails, the RAN releases the wireless session. Thus, it is necessary to reconfigure the wireless session between the AT and the RAN. As a result, it takes a long time until the call connection is completed. Those problems are critical especially for applications (that require real time processing) such as Voice over Internet Protocol (VoIP) and Push to Talk.

In consideration of the aforementioned problems, it is preferable that the call connection processing be performed without the inter-RAN dormant handoff even on a RAN on which a wireless session is not present.

In the current markets, there are ATs that do not support a SecondaryColorCode function. Even when the SecondaryColorCode 402 is included in the SectorParameters message 400 and such an AT (that does not support the SecondaryColorCode function) passes through the boundary between the RANs, the AT transmits a UATIRequest message. Thus, it is necessary that the conventional inter-RAN dormant handoff be performed depending on the AT even on a RAN that supports the SecondaryColorCode.

A DataOverSignaling message that is defined in Non-Patent Document 1 and has a small amount of data can be transmitted and received through an access channel (AC) or a control channel (CC) under the condition that a wireless link is not established. Even when the AT transmits the DataOverSignaling message at the boundary between RANs that support the SecondaryColorCode, similar problems to the problems that occur when the call connection is requested occur. Specifically, in some cases, a wireless session of the AT is not present on the RAN that receives the DataOverSignaling message. Thus, the RAN on which the wireless session is not present needs to process a message such as the DataOverSignaling message.

In order to solve the aforementioned problems, RANs that are adjacent to each other and belong to different subnets use messages and the like to exchange ColorCode parameters of the RANs, IP addresses of base station controllers included in the RANs, wireless resource information of base station transceiver subsystems included in the RANs, and the like.

When the RAN receives ColorCode of an adjacent RAN, the RAN adds the ColorCode of the adjacent RAN to the SecondaryColorCode 402 included in the SectorParameters message 400 and broadcasts the SectorParameters message 400 having the ColorCode of the adjacent RAN added thereto.

When the RAN receives, through the AC from the AT, a message having a UATI that is different from the ColorCode of the RAN, the RAN transfers the message to a base station controller that is included in another RAN having ColorCode that matches the UATI. In this case, even when there is a plurality of base station controllers (that are candidates) included in the RAN to which a message is transferred and the RAN receives a plurality of messages from the same AT, a base station controller is selected from the base station controllers so that the same base station controller is always selected. However, when the UATIRequest message is transmitted by the AT, the RAN does not transfer the message to the adjacent RAN and performs the inter-RAN dormant handoff. Thus, the RAN can support the AT even when the AT does not support the SecondaryColorCode function and passes through the boundary between the RANs.

The wireless session of the AT is present on a RAN having the ColorCode that matches the UATI of the AT. As a result, messages can be processed and call connection processing can be performed without the inter-RAN dormant handoff.

The RAN selects a base station transceiver subsystem (that is under the best conditions such as a distance between the AT and the subsystem and the strength of a radio wave) and establishes a wireless link between the AT and the selected base station transceiver subsystem. RANs that are adjacent to each other exchange information on base station transceiver subsystems of the RANs. Thus, even when the RAN transfers the message to another RAN to perform the call connection processing, a base station transceiver subsystem that is included in the RAN (that transfers the message) is selected to perform the call connection processing. Thus, a base station transceiver subsystem that is under the best conditions for the AT is selected to perform the call connection processing.

When the RAN transfers the message to another RAN to perform the call connection processing, the RANs store a route of the message. Thus, the RANs can transmit and receive messages through the same route afterward. Information on the route of the message is maintained as long as the wireless link is maintained.

After the call connection is completed, the inter-RAN active handoff may be performed so that the wireless session is taken over between the RANs and an UATI is reassigned to the AT. In this case, after the wireless link is established, the UATI is reassigned. Thus, occurrence of a failure of the UATI reassignment can be significantly suppressed.

As another method for processing a message that is transmitted from an AT that belongs to another subnet, a wireless session may be maintained by RANs that are adjacent to each other. In this case, the RAN (from which the AT moves) manages the UATI and is connected to the PDSN, while the other RAN (to which the AT moves) transmits and receives messages to and from the AT and manages the wireless link.

As still another method for processing a message that is transmitted from an AT that belongs to another subnet, after the wireless session is taken over between the RANs, a message may be processed. In order to perform the call connection processing, the RAN first takes over the wireless session and then establishes the wireless link. The RAN finally reassigns a UATI to the AT. In this case, since the UATI is reassigned after the establishment of the wireless link, it is possible to reduce occurrence of a failure of the UATI reassignment and reduce the time required for the call connection.

The aforementioned challenges can be achieved by a base station controller that controls a plurality of base station transceiver subsystems that are to be connected to a mobile terminal. When the base station controller receives a message through a control channel from one of the base station transceiver subsystems, the base station controller determines whether or not identification information included in the message matches identification information of the base station controller. When the identification information included in the message does not match the identification information of the base station controller, the base station controller determines whether or not the message is a message (mobile terminal identifier request message) that indicates a request for an identifier of the mobile terminal. When the message is the mobile terminal identifier request message, the base station controller performs dormant handoff processing. When the message is not the mobile terminal identifier request message, the base station controller transfers the message to another base station controller that corresponds to the identification information included in the message.

The call connection processing can be performed and a message can be processed even on a RAN on which a wireless session is not present.

BRIEF DESCRIPTION OF THE DRAWINGS

Preferred embodiments of the present invention will now be described in conjunction with the accompanying drawings, in which;

FIG. 5 is a diagram showing a system parameter table of a BSC.

FIG. 6 is a diagram showing a system parameter table of a BTS.

FIG. 7 is a diagram showing adjacent BSC information.

FIG. 8 is a diagram showing a format of a RouteUpdate massage.

FIG. 9 is a diagram showing a traffic channel table of a BTS.

FIG. 10 is a diagram showing an AT management table of a BSC.

DETAILED DESCRIPTION OF THE PREFERRED EMBODIMENTS

Figure 1:
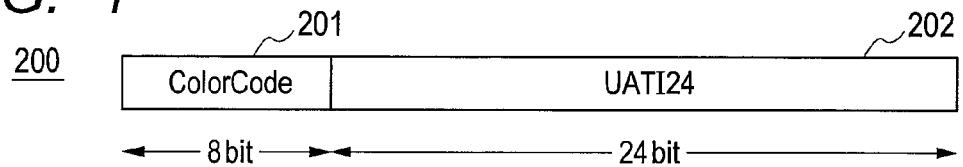
FIG. 1 is a diagram showing a format of UATI32.
Figure 2:
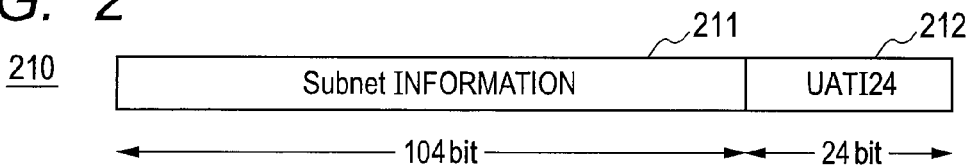
FIG. 2 is a diagram showing a format of UATI128.
Figure 3A:
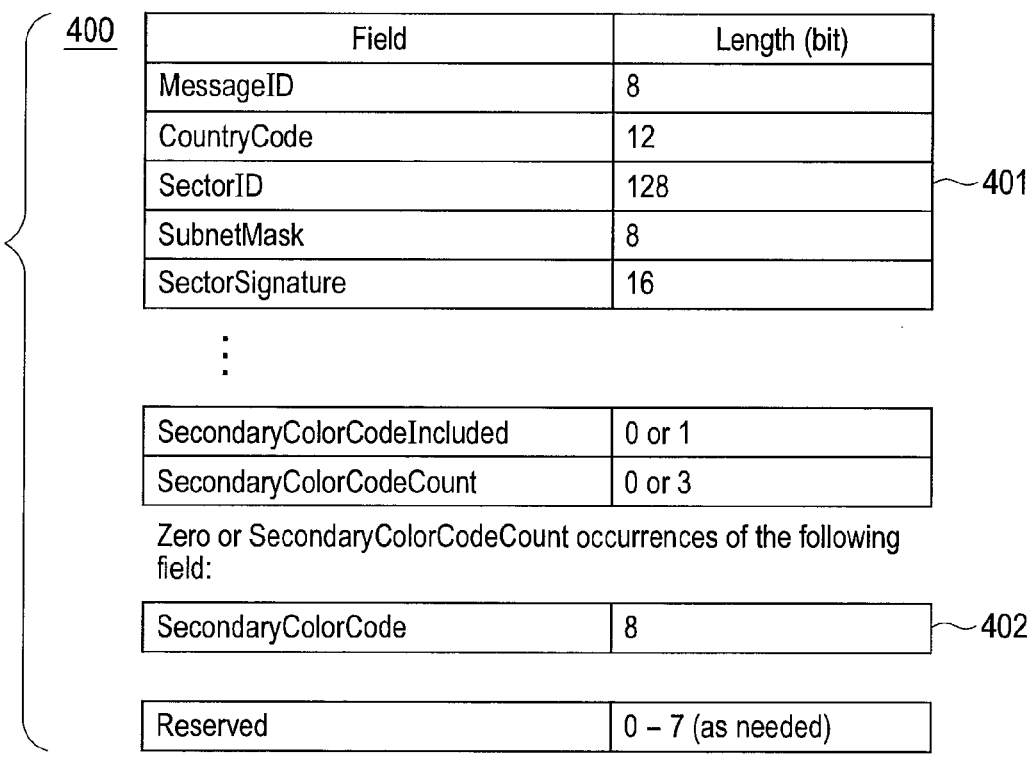
FIG. 3A is a diagram showing a format of a SectorParameters message.
Figure 3B:
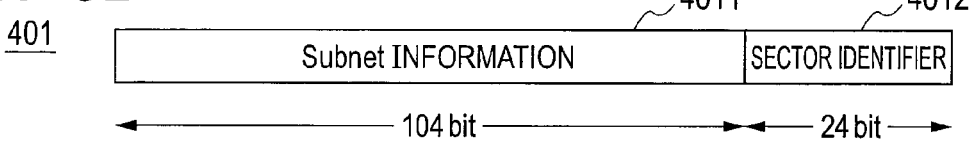
FIG. 3B is a diagram showing a format of SectorID.

Embodiments of the present invention are described below with reference to the accompanying drawings. Substantially the same elements are denoted by the same reference numerals and descriptions of them are not repeated.

First Embodiment

Figure 4:
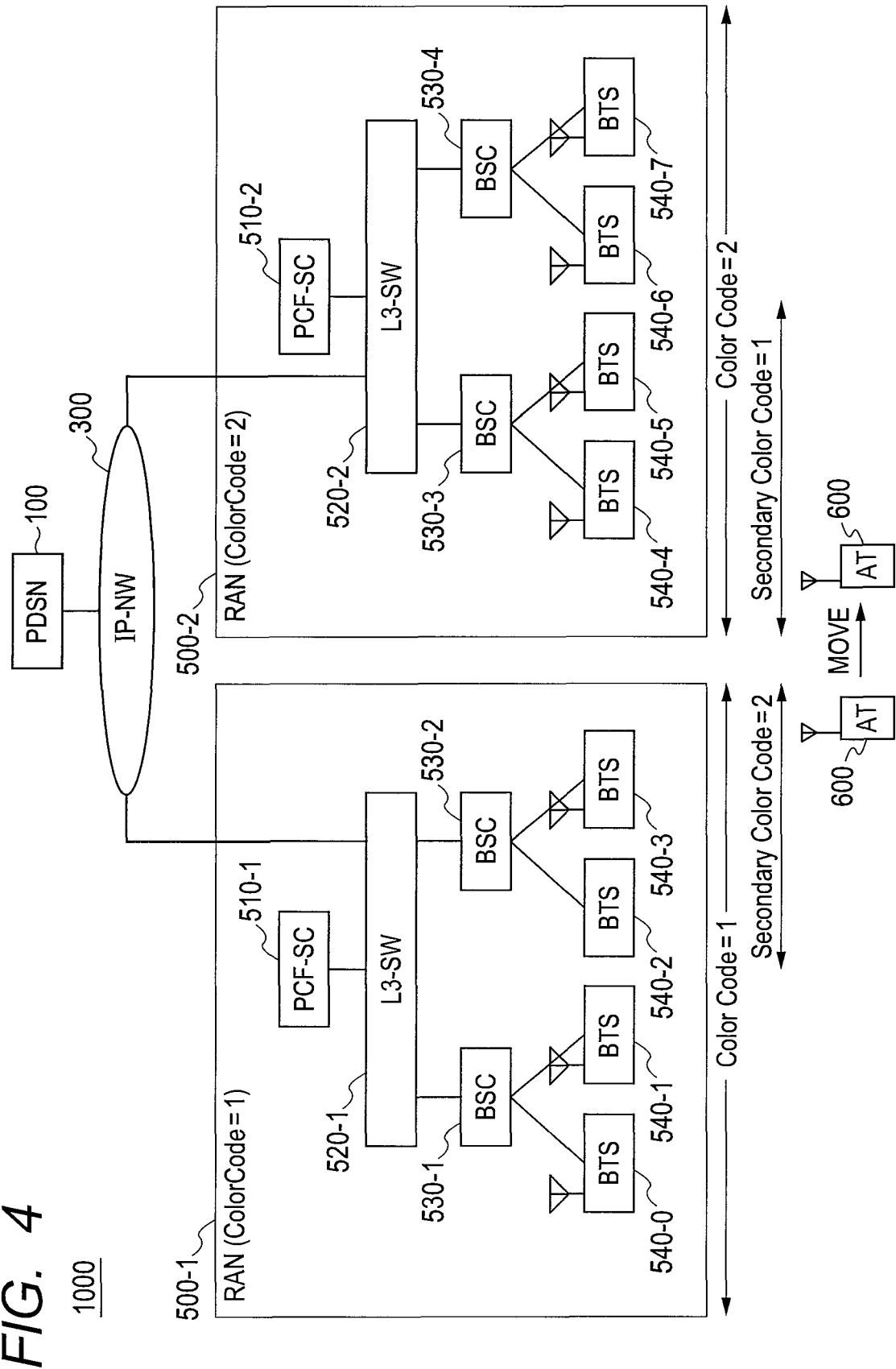
FIG. 4 is a block diagram showing a wireless communication system.

A wireless communication system is described with reference to FIG. 4. In FIG. 4, the wireless communication system 1000 includes a packet data serving node (PDSN) 100, an IP network 300, radio access networks (RANs) 500, and an access terminal (AT) 600. Each RAN 500 includes a packet control function/session control (PCF-SC) (that is a wireless packet processing device) 510, a layer-3 switch (L3-SW) 520, base station controllers (BSCs) 530, and base station transceiver subsystems (BTSs) 540.

The PDSN 100 terminates a packet that is transferred through the Internet (not shown). Each PCF-SC 510 manages a wireless session. Each PCF-SC 510 receives packets from the BSCs 530 and the PDSN 100 and relays the received packets. Each L3-SW 520 connects the PCF-SC 510 to the BSCs 530 and connects a plurality of the RANs 500 to each other through the network 300. Each BSC 530 controls messages that are transmitted and received to and from the AT 600. The BSC 530 controls the BTSs 540. In addition, each BSC 530 receives traffic signals from the BTSs 540 and transfers the traffic signals to the PCF-SC 510. Each BTS 540 manages wireless resources for the AT 600 and wirelessly transmits and receives packets to and from the AT 600. Each BSC 530 is connected to the BTSs 540 through a wide-area Ethernet or a dedicated line. The AT 600 is a mobile terminal.

The PCF-SC 510-1, the BSC 530-1, and the BSC 530-2, which are included in the RAN 500-1, maintain "1" as ColorCode. The PCF-SC 510-2, the BSC 530-3, and the BSC 530-4, which are included in the RAN 500-2, maintain "2" as ColorCode. The BSC 530-2 that is included in the RAN 500-1 and adjacent to the RAN 500-2 maintains "2" as SecondaryColorCode. The BSC 530-3 that is included in the RAN 500-2 and adjacent to the RAN 500-1 maintains "1" as SecondaryColorCode.

Each BSC 530 has a system parameter table 410 shown in FIG. 5. The system parameter table 410 has Colorcode 411, Subnet 412, BTSIPAddress 413, PilotPN 414, and NeighborBSCAdress 415. IP addresses of the BTSs 540 that are controlled by the BSC 530 are registered in the BTSIPAddress 413 of the system parameter table 410. Pilot pseudo noise (PN) of the BTSs 540 that are controlled by the BSC 530 is registered in the PilotPN 414 of the system parameter table 410. The IP addresses of the BTSs 540 that can be controlled by one BSC 530 can be registered in the BTSIPAddress 413, while pilot PN of the BTSs 540 that can be controlled by one BSC 530 can be registered in the PilotPN 414.

Similarly, each BTS 540 has a system parameter table 420 shown in FIG. 6. The system parameter table 420 includes BSCIPAddress 421. An IP address of the BSC 530 that controls the BTS 540 is registered in the BSCIPAddress 421. In the configuration shown in FIG. 4, information on the BTSs 540-0 and 540-1 is registered in the system parameter table 410 of the BSC 530-1, and information on the BSC 530-1 is registered in each of the system parameter tables 420 of the BTSs 540-0 and 540-1. Information on the BTSs 540-2 and 540-3 is registered in the system parameter table 410 of the BSC 530-2, and information on the BSC 530-2 is registered in each of the system parameter tables 420 of the BTSs 540-2 and 540-3. Information on the BTSs 540-4 and 540-5 is registered in the system parameter table 410 of the BSC 530-3, and information on the BSC 530-3 is registered in each of the system parameter tables 420 of the BTSs 540-4 and 540-5. Information on the BTSs 540-6 and 540-7 is registered in the system parameter table 410 of the BSC 530-4, and information on the BSC 530-4 is registered in each of the system parameter tables 420 of the BTSs 540-6 and 540-7.

The system parameter table 410 of each BSC 530 includes the ColorCode 411 and the Subnet 412. The ColorCode of the RAN that includes the BSC 530 is registered in the ColorCode 411, while a subnet of the RAN that includes the BSC 530 is registered in the Subnet 412. Each of the BSCs 530-1 and 530-2 that are included in the RAN 500-1 assigns "1" to the ColorCode 411 and assigns information indicative of the RAN 500-1 to the Subnet 412. Each of the BSCs 530-3 and 530-4 that are included in the RAN 500-2 assigns "2" to the ColorCode 411 and assigns information indicative of the RAN 500-2 to the Subnet 412.

The system parameter table 410 of each BSC 530 includes the NeighborBSCAddress 415 in which IP addresses of BSCs 530 included in the RAN that is adjacent to the RAN that includes the BSC 530 are registered. The IP addresses of the BSCs 530 that can be located adjacent to one BSC 530 are registered in the NeighborBSCAddress 415.

In the configuration shown in FIG. 4, the IP address of the BSC 530-3 is registered in the NeighborBSCAddress 415 of the BSC 530-2, and the IP address of the BSC 530-2 is registered in the NeighborBSCAddress 415 of the BSC 530-3. Each BSC 530 transmits, as adjacent BSC information shown in FIG. 7, a message (that indicates information on the BSC 530) to adjacent BSCs whose IP addresses are registered in the NeighborBSCAddress 415 of the BSC 530.

As shown in FIG. 7, the adjacent BSC information 430 includes NeighborBSCAddress 431, ColorCode 432, BTSIPAddress 433, and PilotPN 434. The IP address of each adjacent BSC is registered in the NeighborBSCAddress 431, while the ColorCode 411 of each adjacent BSC is registered in the ColorCode 432. The BTSIPAddress 433 includes the BTSIPAddress 413 parameters of the BTSs that are controlled by the adjacent BSC, while the PilotPN 434 includes the PilotPN 414 parameters of the BTSs that are controlled by the adjacent BSC.

Each BSC 530 receives the messages (adjacent BSC information 430) and then stores the adjacent BSC information 430 therein. Since the BSC 530 receives the adjacent BSC information 430 from a plurality of BSCs 530, the BSC 530 manages the information for each BSC. The ColorCode 432, the BTSIPAddress 433, and the PilotPN 434 are added to the system parameter table 410 managed by the BSC 530 and are inserted behind the NeighborBSCAddress 415 of the system parameter table 410.

According to the configuration shown in FIG. 4, the IP address and ColorCode parameter of the BSC 530-3 and the IP addresses and PilotPN parameters of the BTSs 540-4 and 540-5 are stored in the BSC 530-2 as the adjacent BSC information 430. In addition, the IP address and ColorCode parameter of the BSC 530-2 and the IP addresses and PilotPN parameters of the BTSs 540-2 and 540-3 are stored in the BSC 530-3 as the adjacent BSC information 430.

Each BSC 530 instructs the BTSs 540 (that are controlled by the BSC 530) on the contents of a SectorParameters massage 400. The BSC 530 informs the BTSs 540 (that are controlled by the BSC 530) of the Subnet 412 of the BSC 530. Each BTS 540 causes the informed Subnet 412 to be included into Subnet information 4011 of a Sector ID 401 included in the SectorParameters message 400. When the ColorCode 432 that is different from the ColorCode 411 of the BSC 530 is included in the adjacent BSC information 430, the BSC 530 informs the BTSs 540 of the ColorCode 432 of the adjacent BSC information 430 as SecondaryColorCode. Each BTS 540 receives the SecondaryColorCode and causes the received information that is transmitted from the BSC 530 to be included in SecondaryColorCode 402 of the SectorParameters message 400. Each BTS 540 receives the contents of the SectorPameters message 400 and then regularly broadcasts the SectorParameters message 400.

In the configuration shown in FIG. 4, information that indicates the RAN 500-1 is included in the Subnet information 4011 of the Sector ID 401 included in the SectorParameters messages 400 that are broadcasted by the BTSs 540-0 to 540-3 included in the RAN 500-1. In addition, information that indicates the RAN 500-2 is included in the Subnet information 4011 of the Sector ID 401 included in the SectorParameters messages 400 that are broadcasted by the BTSs 540-4 to 540-7 included in the RAN 500-2. The SecondaryColorCode 402 fields of the SectorParameters messages 400 that are broadcasted by the BTSs 540-2 and 540-3 (included in the RAN 500-1 that is adjacent to the RAN 500-2) include "2" that is the ColorCode of the RAN 500-2. The SecondaryColorCode 402 fields of the SectorParameters messages 400 that are broadcasted by the BTSs 540-4 and 540-5 (included in the RAN 500-2 that is adjacent to the RAN 500-1) include "1" that is the ColorCode of the RAN 500-1.

When initial connection processing is performed, the RAN 500-1 assigns unicast access terminal identifiers (UATI32 and UATI128 (that are collectively called a UATI)) to the AT 600, and the RAN 500-1 and the AT 600 configure a wireless session. The wireless session is maintained in the PCF-SC 510-1. A value "1" that is the ColorCode of the RAN 500-1 is set to the ColorCode 201 of the UATI32 200 of the AT 600, while information that indicates the RAN 500-1 is set to the Subnet information 211 of the UATI128 210.

In order to perform data communications between the AT 600 and the RAN 500-1, a wireless link is established between the AT 600 and the RAN 500-1. A point-to-point protocol (PPP) is established between the AT 600 and the PDSN 100 to allow the AT 600 and the RAN 500-1 to perform data communications. In this case, the state of the AT 600 is changed to an active state.

When a certain non-communication state occurs, the AT 600 and the RAN 500-1 release the wireless link. In this case, the wireless session is maintained in the PCF-SC 510-1. In addition, the PPP is maintained between the AT 600 and the PDSN 100. In this case, the state of the AT 600 is changed to a dormant state.

When the AT 600 is located at the boundary between the RAN 500-1 and the RAN 500-2, the AT 600 alternately receives the SectorParameters messages 400 from the BTS 540-2, the BTS 540-3, the BTS 540-4, and the BTS 540-5. In this case, the SecondaryColorCode 402 fields of the SectorParameters messages 400 include "1" (that is the ColorCode of the RAN 500-1) or "2" (that is the ColorCode of the RAN 500-2). Thus, the AT 600 does not transmit a UATIRequest message (that requests reassignment of the UATI) even when the AT 600 detects that the Subnet information 4011 of the SectorID 401 included in the SectorParameters message 400 is different from the Subnet information 211 included in the UATI128 210 of the AT 600.

The following describes a RouteUpdate message 460 that is transmitted by the AT 600 (that is in the dormant state) to the BTS 540 with reference to FIG. 8. As shown in FIG. 8, the RouteUpdate message 460 includes fields (MessageID, MessageSequence, ReferencePilotPN, ReferencePilotStrength, ReferenceKeep, NumPilot, PilotPNPhase, ChannelIncluded, Channel, PilotStrength, Keep, and Reserved) and Lengths (bits) of the fields. The RouteUpdate message 460 is a message that is used to inform the BTS of a plurality of received pilot information pieces.

A traffic channel table 450 is described below with reference to FIG. 9. As shown in FIG. 9, the traffic channel table 450 includes a traffic channel identifier 451 and UATI32 452. Each BTS 540 includes the traffic channel table 450, while the UATI32 of the AT that has established a traffic channel is associated with the traffic channel identifier 451.

An AT management table 440 is described below with reference to FIG. 10. As shown in FIG. 10, the AT management table 440 includes UATI32 441, BSCIPAddress 442, and BTSIPAddress 443. Each BSC 530 includes the AT management table 440, while the AT 600, the BSC 530, and the BTSs 540 are associated with each other in the AT management table 440.

Figure 11:
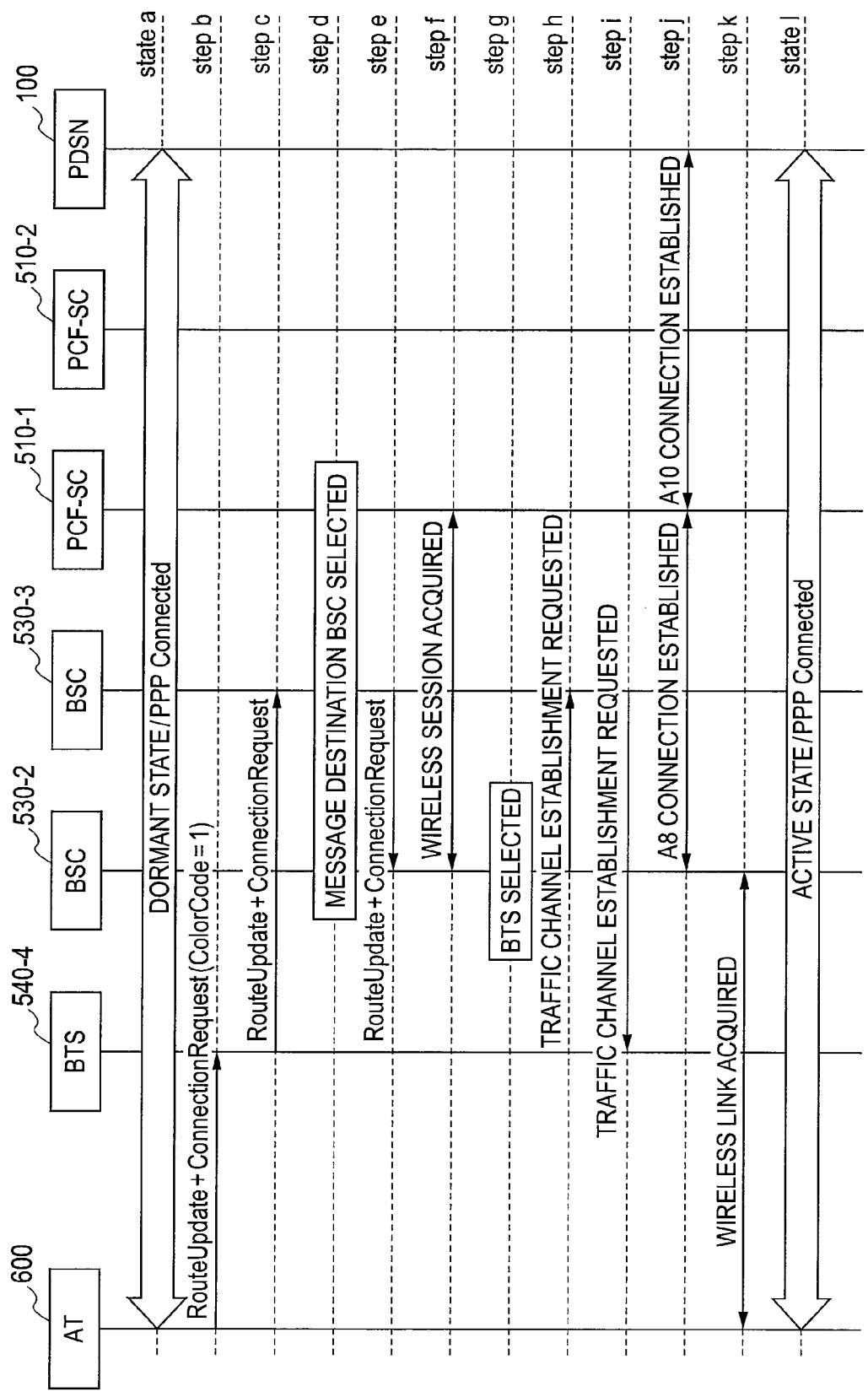
FIG. 11 is a diagram showing a sequence that is performed when a call connection is requested in a different subnet.

The following describes a sequence that is performed in the case where the AT 600 is changed to the dormant state while being controlled in the RAN 500-1, geographically moves to the RAN 500-2, and requests a call connection while being controlled in the BTS 540-4, with reference to FIG. 11.

The AT 600 that is in the dormant state (state a) transmits a RouteUpdate message and a ConnectionRequest message to the BTS 540-4 in order to request a call connection (step b). The RouteUpdate message and the ConnectionRequest message are transmitted on an access channel (AC). The UATI32 200 is included in ATI Record of MAC Layer Header of the AC. A value "1" that is the ColorCode of the RAN 500-1 is set to the ColorCode 201 of the UATI32 200 of the AT 600. The BTS 540-4 references the BSCIPAddress 421 of the system parameter table 420, receives the messages from the AT 600, and transfers the messages to the BSC 530-3 (step c).

The BSC 530-3 selects a message destination BSC (step d). In this case, the BSC 530-3 selects the BSC 530-2 and transfers the RouteUpdate message and the ConnectionRequest message to the BSC 530-2 (step e). The BSC 530-2 acquires a wireless session between the BSC 530-2 and the PCF-SC 510-1 (step f). The BSC 530-2 selects a particular BTS (step g). The BSC 530-2 transmits a request (traffic channel establishment request) for establishment of a traffic channel to the BSC 530-3 (step h).

The BSC 530-3 transmits the traffic channel establishment request to the BTS 540-4 that is selected by the BSC 530-2 (step i). An A8 connection is established between the BSC 530-2 and the PCF-SC 510, while an A10 connection is established between the PCF-SC 510 and the PDSN 100 (step j). The BSC 530-2 establishes a wireless session between the BSC 530-2 and the AT 600 (step k). The states of the AT 600 and PDSN 100 are changed to active states (state 1).

Figure 12:
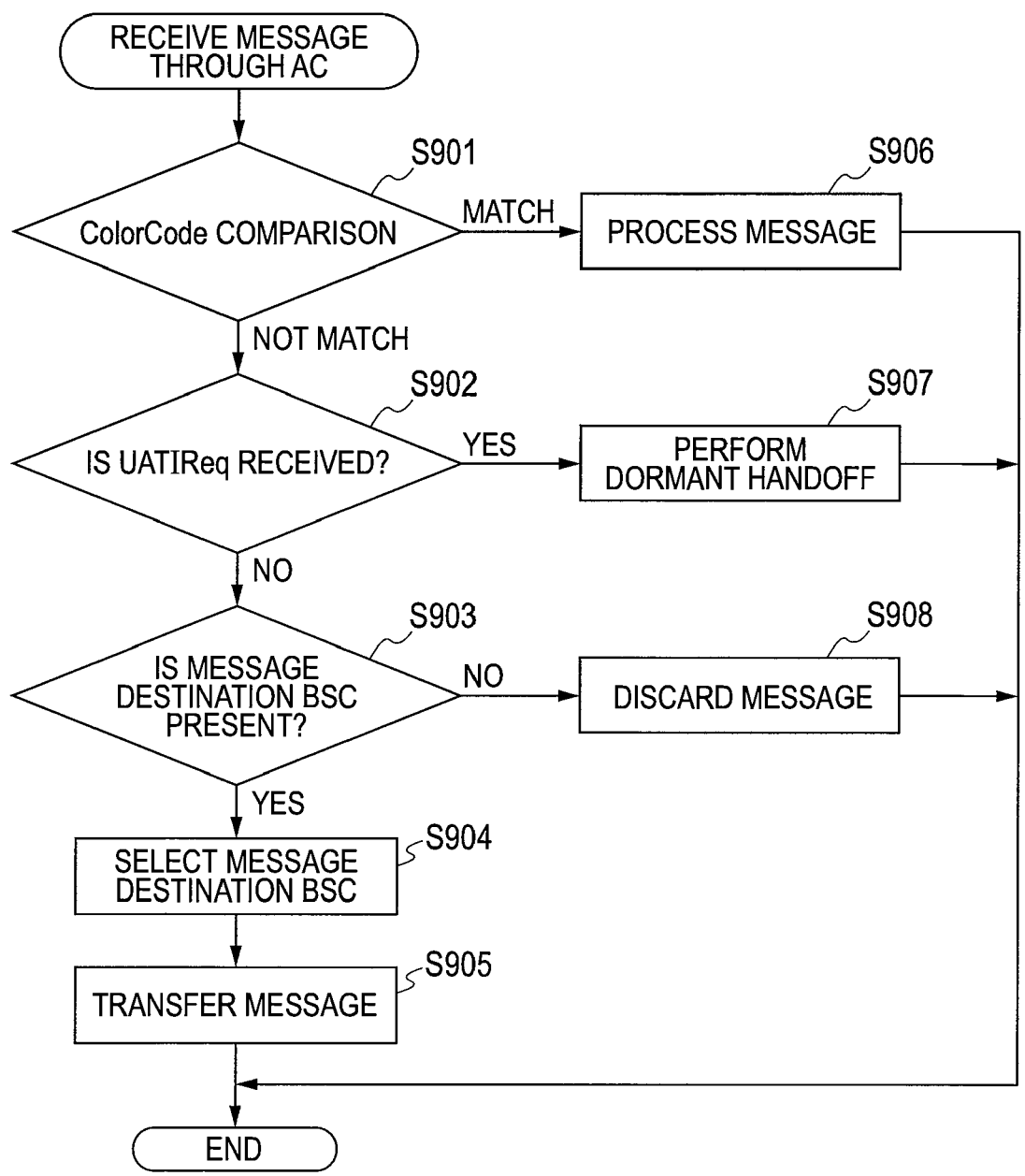
FIG. 12 is a flowchart of a process that is performed by a BSC when the BSC receives a message through an AC.

The following describes operations of the BSC 530-3 when the BSC 530-3 receives the messages through the AC with reference to FIG. 12. As shown in FIG. 12, the BSC 530-3 compares the ColorCode 201 of the UATI32 200 included in the messages received through the AC with the ColorCode 411 (of the BSC 530-3) registered in the system parameter table 410 (S901). When the ColorCode 201 and ColorCode 411 match each other, the BSC 530-3 processes the RouteUpdate message and the ConnectionRequest message (since the BSC 530-3 does not need to transfer the messages to another RAN). Then, the BSC 530-3 and the AT 600 perform call connection processing (S906). Then, the sequence is terminated. When the ColorCode 201 and ColorCode 411 do not match in step S901, the BSC 530 confirms whether or not the UATIRequest message is included in the messages received through the AC (S902). When the UATIRequest message is included in the messages received through the AC, the BSC 530 acquires the wireless session from the PCF-SC 510, assigns a new UATI to the AT 600, and performs inter-RAN dormant handoff (S907). Then, the flow is terminated. Even when the AT 600 does not support a SecondaryColorCode function and passes through the boundary between the RANs, the BSC 530 can perform step 907 to support the AT 600. When the UATIRequest message is not included in the messages received through the AC in step S902, the BSC 530 determines whether or not there is a BSC of which ColorCode 432 (that is included in the adjacent BSC information 430) matches the ColorCode 201 that is included in the messages received through the AC (S903).

When the BSC cannot select a BSC in step 903, the BSC discards the messages (S908) and the flow is terminated. When the BSC can select BSCs in step S903 and a plurality of BSCs that are candidates for message destinations are present, the BSC 530 selects one of the BSCs (S904). The BSC 530 transfers the messages received through the AC to a BSC indicated in the NeighborBSCAddress 431 of the selected BSC (S905) and the flow is terminated.

In this case, a plurality of messages is transferred on the AC between the AT 600 and the BSC 530 in some cases. Thus, it is preferable that the same BSC be always selected for a particular AT 600. In order to solve this, hashing shown in Equation 1 is performed using UATI24 202 (that is included in the UATI 32 200 of the MAC Layer Header of the AC) and the number of BSCs (that are candidates for message destinations to which the messages are to be transferred) to determine a message destination BSC (to which the messages are to be transferred).

$$\text{Hash value} = \text{UATI 24 Mod the number of BSCs (that are candidates for message destinations}$$  (Equation 1)

Specifically, it is assumed that the BSCs that are candidates for massage destinations are three BSCs (BSC 100, BSC 200, and BSC 300) and indices 0, 1, and 2 are respectively assigned to the three BSCs. In the assumption, when the UATI24 202 that is included in the message transmitted from the AT 600 and is received by the BSC indicates 0x013456, the hash value is "0x013456 Mod 3"=1. The BSC 200 that has Index1 is selected. Similarly, when the UATI 24 202 indicates 0x012345, the hash value is "0x012345 Mod 3"=0. The BSC 100 that has Index0 is selected. Every time the BSC receives the message through the AC, a message destination BSC is determined according to Equation 1. Thus, the same message destination BSC can be always selected for a particular AT 600. When the message destination BSC is determined, the BSC 530 transfers the messages received through the AC to the BSC indicated in the NeighborBSCAddress 431 (step e).

The BSC 530-2 receives the ConnectionRequest message and then acquires the wireless session from the PCF-SC 510-1 (step f). Next, the BSC 530-2 extracts the PilotPN (that is to be used) from the RouteUpdate message that is simultaneously informed with the ConnectionRequest message and selects a BTS or BTSs that will establish wireless links (step g). Specifically, when the ReferenceKeep field in the RouteUpdate message indicates 1, the BSC 530-2 uses the PilotPN that is included in the ReferencePilotPN field. On the other hand, when the ReferenceKeep field indicates 0, the BSC 530-2 selects PilotPN for which the Keep field is set to 1 and which has the largest Pilot strength indicated by the PilotStrength field. The BSC 530-2 compares the selected PilotPN, the PilotPN 414 of the system parameter table 410, and the PilotPN 434 of the adjacent BSC information 430 to determine a BTS or BTSs that will establish wireless links. In this case, the BTS 540-4 and the BTS 540-5, which are included in the adjacent RAN 500-2, are included in the BTSs selected by the BSC 530-2. Thus, when the ConnectionRequest message is transferred from the RAN 500-2 to the RAN 500-1 in order to perform the call connection processing, the BTS 540-4 and the BTS 540-5 can be selected. In the sequence shown in FIG. 11, the BTS 540-4 is selected.

After the BTSs are selected, the BSC 530-2 registers the UATI32 200 of the AT 600 into the UATI32 441 of the AT management table 440 that is used to manage each AT 600. The BSC 530-2 registers, into the BSCIPAddress 442, the IP address of the BSC that manages the selected BTS. The BSC registers the IP address of the selected BTS into the BTSIPAddress 443. In the sequence shown in FIG. 11, the UATI32 200 of the AT 600 is registered into the UATI32 441 of the AT management table 440 of the BSC 530-2; the IP address of the BSC 530-3 is registered into the BSCIPAddress 442; and the IP address of the BTS 540-4 is registered into the BTSIPAddress 443.

The BSC 530-2 causes the UATI32 441 and the BTSIPAddress 443 to be included in the traffic channel establishment request and then transmits the traffic channel establishment request (that includes the UATI32 441 and the BTSIPAddress 443) to the BSC 530-3 (step h). After the BSC 530-3 receives the traffic channel establishment request, the BSC 530-3 registers, into the UATI32 441 of the AT management table 440 of the BSC 530-3, the UATI32 441 (of the AT 600) included in the traffic channel establishment request. In addition, the BSC 530-3 registers the IP address of the BTS 540-4 into the BTSIPAddress 443 and registers the IP address of the BSC 530-2 (that transmits the traffic channel establishment request) into the BSCIPAddress 442.

The BSC 530-3 transfers the traffic channel establishment request (transmitted from the BSC 530-2) to the BTS 540-4 whose IP address is registered in the BTSIPAddress 443 of the AT management table 440 (step i). The BTS 540-4 receives the traffic channel establishment request and establishes a traffic channel for the AT 600. In this case, the traffic channel identifier 451 and the UATI32 452 are registered into the traffic channel table 450 that is used to manage each traffic channel. An identifier used when the traffic channel is established is registered into the traffic channel identifier 451. The UATI32 that is included in the traffic channel establishment request is registered into the UATI32 452.

In the aforementioned procedures, a route of the messages transmitted from the AT 600 is recorded in the AT management tables 440 of the BSCs 530-2 and 530-3 and the traffic channel table 450 of the BTS 540-4. After the procedures, messages are transmitted and received from the BTS 540-4 through the BSC 530-3 to the BSC 530-2 and vice versa. The AT management tables 440 and the traffic channel table 450 are maintained until the wireless link is released. The messages that are transmitted and received after the aforementioned procedures include UATI32 that is information that specifies the AT 600.

Next, an A8 connection is established between the BSC 530-2 and the PCF-SC 510-1 (step j).

Then, a TrafficChannelAssignment message, an RTCAck message, a TrafficChannelComplete message, and the like are transmitted and received between the BSC 530-2 and the AT 600 so that a wireless link is established between the BSC 530-2 and the AT 600 (step k). Those messages are transmitted and received from the BTS 540-4 through the BSC 530-3 to the BSC 530-2 and vice versa. In this case, the state of the AT 600 is changed to the active state (state 1).

The following describes operations when the AT 600 that does not support the SecondaryColorCode function and remains in the dormant state geographically moves from a coverage region of the RAN 500-1 to a coverage region of the RAN 500-2.

The AT 600 receives the SectorParameters message 400 from the BTS 540-4. The SecondaryColorCode 402 of the SectorParameters message 400 transmitted from the BTS 540-4 includes the ColorCode (=1) of the RAN 500-1. However, since the AT 600 does not support the SecondaryColorCode function, the AT 600 detects that the Subnet information 4011 of the SectorID 401 included in the SectorParameters message 400 is different from the Subnet information 211 included in the UATI128 210 of the AT 600. The AT 600 then transmits the UATIRequest message on the AC. The BSC 530-3 receives the UATIRequest message through the BTS 540-4 and then performs the inter-RAN dormant handoff according to the flowchart shown in FIG. 12. That is, the wireless session is taken over between the PCF-SC 510-1 and the PCF-SC 510-2, a new UATI is assigned to the AT 600, and the inter-RAN dormant handoff is performed. Thus, even when the AT 600 that does not support the SecondaryColor-Code function moves through the boundary between the RANs, the AT 600 can be supported.

The aforementioned operations are performed in the same manner when the AT 600 that is in the dormant state geographically moves from the coverage region of the RAN 500-1 to the coverage region of the RAN 500-2 and then moves to a coverage region (that is a region for which the SecondaryColorCode 402 is not included in the SectorParameters message 400) of the BTS 540-6 without the request of the call connection. The AT 600 receives the SectorParameters message 400 of the BTS 540-6. However, the SectorParameters message 400 of the BTS 540-6 does not include the SecondaryColorCode 402. In addition, the Subnet information 4011 of the Sector ID 401 included in the SectorParameters message 400 is different from the Subnet information 211 included in the UATI128 210 of the AT 600. Thus, the AT 600 transmits the UATIRequest message. The BSC 530-4 receives the UATIRequest message and then performs the inter-RAN dormant handoff according to the flowchart shown in FIG. 12.

In the aforementioned embodiment, even when a wireless link is not established on a RAN, the call connection processing can be performed and the messages can be processed in the RAN. In addition, since the call connection processing is performed without the inter-RAN dormant handoff, the probability of a failure of the UATI reassignment can be reduced and the time required for the call connection can be reduced. This is effective especially for applications that require real-time processing.

Even when the SecondaryColorCode function is activated on the RAN and the AT 600 does not support the Secondary-ColorCode function, the AT 600 can perform the inter-RAN dormant handoff.

In the present specification, CC and the AC are called control channels. Data communications can be performed on the control channel even when the AT 600 is in the dormant state.

Second Embodiment

Figure 13:
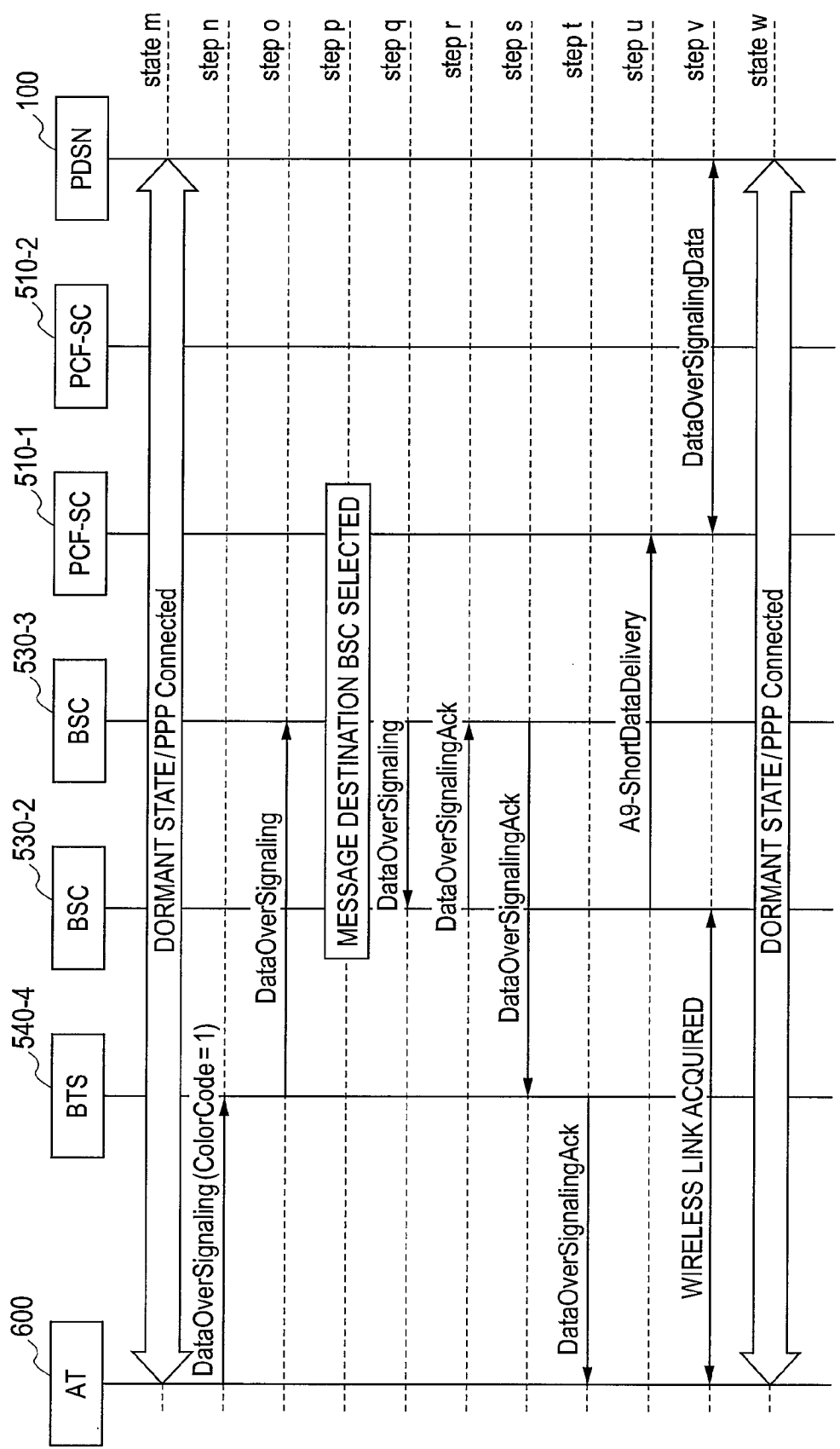
FIG. 13 is a diagram showing a sequence that is performed when a DataOverSignaling message is transmitted in a different subnet.

The following describes the case in which when the AT 600 that is in the dormant state passes through the boundary between the subnets, the AT 600 transmits a DataOverSignaling message on the AC, with reference to FIG. 13.

The DataOverSignaling message that is defined in Non-Patent Document 1 and has a small amount of data can be transmitted and received through the AC or the CC under the condition that a wireless link is not established. FIG. 13 is a diagram showing a sequence that is performed in the case where the AT 600 transmits the DataOverSignaling message on the AC. As shown in FIG. 13, the AT 600 that is in the dormant state (state m) geographically moves from the RAN 500-1 to the RAN 500-2 and transmits the DataOverSignaling message (step n). A value "1" that is the ColorCode of the RAN 500-1 is already set in the ColorCode 201 of the UATI32 200 that is included in the massage transmitted on the AC. The BTS 540-4 transfers the DataOverSignaling message to the BSC 530-3 (step o). When the BSC 530-3 receives the DataOverSignaling message through the AC, the BSC 530-3 selects a message destination BSC according to the flowchart shown in FIG. 12 (step p). In the sequence shown in FIG. 13, the BSC 530-2 is selected. The BSC 530-3 transmits the DataOverSignaling message to the BSC 530-2 (step q). In this case, the BSC 530-3 adds the IP address 413 of the BTS 540-4 to the DataOverSignaling message and then transmits the DataOverSignaling message having the IP address of the BTS 540-4 added thereto.

The BSC 530-2 receives the DataOverSignaling message and transmits a DataOverSignalingAck message to the BSC 530-3 on the basis of the IP address of the BSC 530-3 (step r). In addition, the BSC 530-2 adds the IP address 413 (added to the DataOverSignaling message) of the BTS 540-4 to the DataOverSignalingAck message and transmits the DataOverSignalingAck message to the BSC 530-3. The BSC 530-3 transmits the DataOverSignalingAck message to the BTS 540-4 on the basis of the IP address (of the BTS 540-4) added to the DataOverSignalingAck message (step s). In this case, the BSC 530-3 removes the IP address 413 of the BTS 540-4 and then transmits only the DataOverSignalingAck message. The BTS 540-4 transmits the DataOverSignalingAck message to the AT 600 (step t).

The BSC 530-2 adds the DataOverSignaling message to an A9-ShortDataDelivery message and transmits the A9-ShortDataDelivery message having the DataOverSignaling message added thereto to the PCF-SC 510-1 (step u). The PCF-SC 510-1 confirms the wireless session of the AT 600 and transmits data included in the DataOverSignaling message to the PDSN 100 (step v). The AT 600 remains in the dormant state (state w).

In the sequence shown in FIG. 13, since the wireless link of the AT 600 is not established, the AT management tables 440 of the BSCs and the traffic channel table 450 of the BTS are not used.

The aforementioned embodiment can be applied to all messages that are transmitted on the AC, in addition to the DataOverSignaling message. Thus, messages that are transmitted on the AC can be processed on the RAN on which the wireless session is not established.

Third Embodiment

In the sequence shown in FIG. 11, after the call connection of the AT 600 is completed and the state of the AT 600 is changed to the active state (state 1), the inter-RAN active handoff may be performed between the RAN 500-1 and the RAN 500-2. Details of this method are described below.

After the call connection of the AT 600 is completed (state 1), the BSC 530-2 and the PCF-SC 510-1 release the A8 and A10 connections, and the wireless session is taken over between the PCF-SC 510-1 and the PCF-SC 510-2. Then, the BSC 530-3 and the PCF-SC 510-2 establish the A8 and A10 connections. The AT management table 440 of the BSC 530-2 is released. The BSC 530-3 rewrites the BSCIPAddress 442 of the AT management table 440 from the IP address of the BSC 530-2 to the IP address of the BSC 530-3. The BSC 530-3 reassigns the UATI to the AT 600 so that the UATI32 200 includes 2 (that is the ColorCode of the RAN 500-2) and the UATI128 210 includes the Subnet information of the RAN 500-2.

In the aforementioned embodiment, the UATI reassignment is performed after the establishment of the wireless link. Thus, there is a significantly low probability that the UATI reassignment fails. In the state 1, data flows from the AT 600 through the BTS 540-4, the BSC 530-3, the BSC 530-2, the PCF-SC 510-1 to the PDSN 100 and vice versa. When the inter-RAN active handoff is performed, data flows from the AT 600 through the BTS 540-4, the BSC 530-3, the PCF-SC 510-2 to the PDSN 100 and vice versa. Thus, a delay time can be reduced.

Fourth Embodiment

In the sequence shown in FIG. 11, the BSC 530-3 may acquire the wireless session from the PCF-SC 510-1 and transmit and receive a message to and from the PCF-SC 510-1, instead of transferring the massage to the BSC 530-2. Details of this method are described below.

The BSC 530-3 stores the IP address of the PCF-SC 510-1 and the ColorCode of the RAN 500-1 as adjacent PCF-SC information. When the BSC 530-3 receives a message having the ColorCode of the RAN 500-1 through the AC, the BSC 530-3 references the adjacent PCF-SC information and acquires the wireless session from the PCF-SC 510-1, or the BSC 530-3 transfers the message to the PCF-SC 510-1 and processes the message. When the wireless link is established, each of the BSC 530-3 and the PCF-SC 510-1 stores information such as the UATI of the AT and the IP address of the other of the BSC 530-3 and the PCF-SC 510-1 and transmits and receives messages on the same route afterward.

Fifth Embodiment

In the sequence shown in FIG. 11, the BSC 530-3 may cause the wireless session to be taken over between the PCF-SC 510-1 and the PCF-SC 510-2 and then transmit and receive a message to and from the PCF-SC 510-2, instead of transferring the message to the BSC 530-2. Details of this method are described below.

The PCF-SC 510-2 stores the IP address of the PCF-SC 510-1 and the ColorCode of the RAN 500-1 as adjacent PCF-SC information. When the BSC 530-3 receives a message having the ColorCode of the RAN 500-1 through the AC, the BSC 530-3 informs the PCF-SC 510-2 of the ColorCode that is included in the message received through the AC. The PCF-SC 510-2 references the adjacent PCF-SC information and acquires the wireless session from the PCF-SC 510-1.

The BSC 530-3 acquires the wireless session from the PCF-SC 510-2 or transfers the message to the PCF-SC 510-2 and processes the message.

What is claimed is:

1. A base station controller that controls a plurality of base station transceiver subsystems that are to be connected to a mobile terminal,
   wherein, when a message that is transmitted from one of the base station transceiver subsystems is received through a control channel, it is determined whether or not identification information included in the message matches identification information of the base station controller;
   when the identification information included in the message does not match the identification information of the base station controller, it is determined whether or not the message is a mobile terminal identifier request message;
   when the message is the mobile terminal identifier request message, dormant handoff processing is performed; and
   when the message is not the mobile terminal identifier request message, the message is transferred to another base station controller that corresponds to the identification information included in the message.

2. The base station controller according to claim 1, comprising:
   a table that includes the identification information of the base station controller, addresses and wireless management information of the plurality of base station transceiver subsystems, an address of the other base station controller, identification information of the other base station controller, and addresses and wireless management information of base station transceiver subsystems that are controlled by the other base station controller.

3. The base station controller according to claim 1, wherein the identification information and the addresses of the base station transceiver subsystems are exchanged between the base station controller and the other base station controller.

4. The base station controller according to claim 1, wherein a route of the message is stored in the base station controllers, and messages that are transmitted and received afterward are processed on the same route.

5. The base station controller according to claim 1, comprising:
a table that includes identification information of the mobile terminal, an address of the base station controller to which the message is transmitted, and an addresses of the base station transceiver subsystems that are controlled by the base station controller to which the message is transmitted.

6. The base station controller according to claim 1, wherein, when a plurality of other base station controllers that correspond to identification information of the mobile terminal are present and receive a plurality of messages from the same mobile terminal, a base station controller to which the message is transmitted is selected from the other base station controllers so that the same base station controller is always selected.

7. The base station controller according to claim 1, wherein the base station controller receives a message from the other base station controller and selects a base station transceiver subsystem that is under the best conditions such as a distance between the mobile terminal and the base station transceiver subsystem and the strength of a radio wave from among the plurality of the base station transceiver subsystems that are controlled by the base station controller and base station transceiver subsystems that are controlled by the other base station controller so that call connection processing is performed.

8. The base station controller according to claim 1, wherein the base station controller transmits a message through the other base station controller to the mobile terminal on the same route as a message that is transmitted from the mobile terminal and transferred through the other base station controller.

9. A wireless packet processing device that manages a wireless session in cooperation with the base station controller of claim 1,
wherein, under the condition that a message is transferred between a plurality of base station controllers so that call connection processing is performed and a message and data that are transmitted and received afterward are processed between the plurality of base station controllers, a wireless session is transferred between the wireless packet processing device and another wireless packet processing device, and a message and data are processed on a route that includes one of the base station controllers and the wireless packet processing device and does not include the other of the base station controllers.

10. A wireless packet processing device that manages a wireless session in cooperation with a base station controller that controls a plurality of base station transceiver subsystems that are to be connected to a mobile terminal,
wherein, when the base station controller receives a message through a control channel from one of the base station transceiver subsystems, the base station controller determines whether or not identification information included in the message matches identification information of the base station controller,
when the identification information included in the message does not match the identification information of the base station controller, the base station controller determines whether or not the message is a mobile terminal identifier request message,
when the message is the mobile terminal identifier request message, the base station controller performs dormant handoff processing,
when the message is not the mobile terminal identifier request message, the base station controller acquires a wireless session from the wireless packet processing device corresponding to the identification information included in the message or transfers the message to the wireless packet processing device corresponding to the identification information included in the message.

11. The wireless packet processing device according to claim 10,
wherein a route of the message is stored in the wireless packet processing device and the base station controller, and messages that are transmitted and received afterward are processed on the same route.

12. A wireless packet processing device that manages a wireless session in cooperation with a base station controller that controls a plurality of base station transceiver subsystems that are to be connected to a mobile terminal,
wherein, when the base station controller receives a message through a control channel from one of the base station transceiver subsystems, the base station controller determines whether or not identification information included in the message matches identification information of the base station controller,
when the identification information included in the message does not match the identification information of the base station controller, the base station controller determines whether or not the message is a mobile terminal identifier request message,
when the message is the mobile terminal identifier request message, the base station controller performs dormant handoff processing,
when the message is not the mobile terminal identifier request message, the base station controller informs the wireless packet processing device of the identification information included in the message,
the wireless packet processing device acquires the wireless session from another wireless packet processing device corresponding to the informed identification information, and
the base station controller acquires the wireless session from the wireless packet processing device or transfers the message to the wireless packet processing device.

13. The wireless packet processing device according to claim 12, comprising:
a table that includes identification information of the wireless packet processing device, an address of the other wireless packet processing device, and identification information of the other wireless packet processing device.

* * * * *